(12) United States Patent  
Guo

(10) Patent No.: US 9,109,156 B2  
(45) Date of Patent: Aug. 18, 2015

(54) CHEMILUMINESCENT SYSTEM

(71) Applicant: Cheng Guo, Scarsdale, NY (US)

(72) Inventor: Cheng Guo, Scarsdale, NY (US)

(73) Assignees: IMPERIAL TOY LLC, North Hills, CA (US); MAGGILUME, LLC, Simsbury, CT (US); OMNITECH INNOVATIONS CO., LTD, Beilun, Ningbo (CN)

( * ) Notice: Subject to any disclaimer, the term of this patent is extended or adjusted under 35 U.S.C. 154(b) by 0 days.

(21) Appl. No.: 13/998,715

(22) Filed: Nov. 26, 2013

(65) Prior Publication Data  
US 2014/0166949 A1 Jun. 19, 2014

Related U.S. Application Data

(62) Division of application No. 13/374,508, filed on Dec. 30, 2011, now abandoned.

(51) Int. Cl.  
C09K 11/07 (2006.01)  
A63H 33/28 (2006.01)  
F21K 2/06 (2006.01)

(52) U.S. Cl.  
CPC .. *C09K 11/07* (2013.01); *F21K 2/06* (2013.01)

(58) Field of Classification Search  
None  
See application file for complete search history.

(56) References Cited

U.S. PATENT DOCUMENTS

| 4,405,513 | A | * | 9/1983 | Kamhi | 252/700 |
| 4,450,305 | A | * | 5/1984 | Kamhi | 568/611 |
| 4,462,931 | A | * | 7/1984 | Cohen et al. | 252/700 |
| 4,547,317 | A | * | 10/1985 | Kamhi | 252/700 |
| 4,717,511 | A | * | 1/1988 | Koroscil | 252/700 |
| 5,246,631 | A | * | 9/1993 | Halbritter | 252/700 |
| 6,824,439 | B2 | * | 11/2004 | Ammon, Jr. | 446/15 |
| 2004/0238803 | A1 | * | 12/2004 | Yamate | 252/700 |
| 2011/0084243 | A1 | * | 4/2011 | Cranor et al. | 252/700 |

OTHER PUBLICATIONS

Gravel et al. (www.adhesivesmag.com, Feb. 2010, pp. 15-18).*

* cited by examiner

*Primary Examiner* — Vu A Nguyen  
(74) *Attorney, Agent, or Firm* — Snell & Wilmer L.L.P.

(57) ABSTRACT

An aqueous-based self-illuminating bubble-forming composition is provided. The composition comprises an oxalate component comprising an oxalate ester and a solvent; an activator component comprising a peroxide, a catalyst, and water; a surfactant; and a fluorescer in admixture with an aqueous bubble-forming solution. One or more of the same or different surfactants may be present in the activator component; the oxalate component; the activator component and the oxalate component; the aqueous bubble-forming solution; the activator component and the aqueous bubble-forming solution; the oxalate component and the aqueous bubble-forming solution; or in the oxalate component, the activator component and the aqueous bubble-forming solution.

34 Claims, No Drawings

CHEMILUMINESCENT SYSTEM

CROSS-REFERENCE TO RELATED APPLICATION

This application is a division of copending utility application Ser. No. 13/374,508 filed Dec. 30, 2011.

FIELD OF THE INVENTION

The invention relates to a chemiluminescent system as well as to self-illuminated fluids and self-illuminate bubbles which may be formed using such system, and to devices used in conjunction with the system to contain or dispense such fluid or bubbles.

BACKGROUND OF THE INVENTION

Chemiluminescent systems which produce light upon admixture of two components are well known. The two components are kept separate until light is desired. At the desired time, the two components are mixed and light is produced. The intensity, duration and color of the light will depend on the ingredients of the two components.

The first component is an oxalate component which comprises an oxalate ester. The second component is an activator component comprising a peroxide and a catalyst. The system will also include one or more fluorescers which may be present in either component. The fluorescer(s) are typically selected on the basis of the desired coloration of the light.

The chemiluminescent system must also include one or more solvents. Typical prior art chemiluminescent systems require the presence of one or more solvents for the oxalate component and one or more solvents for the activator component. The solvents selected for the two components may be different but they should be miscible.

The solvent(s) selected for the oxalate component must dissolve the selected oxalate ester, and the solvent(s) for the activator component must solubilize the selected peroxide and the selected catalyst. If the fluorescer is present in the oxalate component, the solvent selected for the oxalate component must solubilize the selected fluorescer as well as the selected oxalate ester. If the fluorescer is present in the activator component, the solvent must solubilize the selected fluorescer, the selected peroxide, and the selected catalyst.

Typical solvents disclosed in the prior art for the oxalate component include esters such as ethyl acetate, ethyl benzoate, butyl benzoate, dimethyl phthalate, dibutyl phthalate, dioctyl phthalate, methyl formate, triacetin, diethyl oxalate and dioctyl terphthalate; aromatic hydrocarbons such as benzene, toluene, ethylbenzene, and butylbenzene; chlorinated hydrocarbons such as chlorobenzene, o-dichlorobenzene, m-dichlorobenzene, chloroform, carbon tetrachloride, hexachloromethane and tetrachlorotetrafluoropropane; ethers such as a propylene glycol dihydrocarbyl ether, e.g. dipropylene glycol dimethyl ether, 2-ethoxyethanol, diethylene glycol butyl ether and propylene glycol n-propyl ether.

Typical solvents disclosed in the prior art for the activator component include alcohols such as t-butyl alcohol, ethanol, n-octanol, 3-methyl-3-pentanol and 3,6-dimethyloctanol-3; esters such as ethyl acetate, ethyl benzoate, dimethylphthalate, dibutylphthalate and methyl formate; and ethers such as diethyl ether, diamyl ether, tetrahydrofuran, dioxane, diethylene glycol monobutyl ether, perfluoropropyl ether and 1,2-dimethoxyethane.

Prior art disclosures of chemiluminescent systems utilizing the solvents listed above may be found in the following US patents and published patent applications: U.S. Pat. Nos. 3,816,326; 4,678.608; 4,717,511; 5,281,367; 5,597,517; 6,126,871; 20050098766; 20050224768; 20080246009; and 20110084243.

The organic solvents listed above are generally disadvantageous due to environmental, health, safety, nuisance and malodorous issues. It would be most desirable if a water-based chemiluminescent system could be provided such that the solvent for the activator component comprises water and the solvent for the oxalate component comprises a minimal amount of an organic solvent that is acceptable from an environmental, health, safety, nuisance and odor point of view.

Prior to the present invention, the use of water as the solvent for the activator component was not considered possible. It is well known that, upon admixture of the oxalate and activator components, the water would degrade the oxalate ester present in the oxalate component to the point that the intensity and duration of the light produced by such a system was seriously diminished. Accordingly, a water-based system was deemed commercially useless.

SUMMARY OF THE INVENTION

It has now been found that it is possible to provide an aqueous-based chemiluminescent system in which the organic solvent that would otherwise be required for the activator component can be replaced with water and further that the concentration of the organic solvent that is employed in the oxalate component may be significantly reduced. This is quite surprising since it has always been thought that the solvent for the activator component had to be an organic-based solvent since the presence of significant amounts of water would degrade the oxalate ester employed in the oxalate component when the oxalate and activator components were mixed to provide the chemiluminescent effect. Further, it had always been thought that it was necessary to have a high concentration of organic solvent in the oxalate component to insure that the oxalate ester would be fully miscible with all of the ingredients in the system.

It is a feature of the aqueous-based chemiluminescent system as disclosed herein that it comprises a minimal amount of an organic solvent. Accordingly, the system is acceptable from an environmental, health, safety, nuisance and odor point of view which may enable the system to provide a self-illuminating solution, fluid and/or bubble that does not necessarily have to be contained in a closed container, i.e., such self-illuminating solutions, fluids and/or bubbles can be provided in a manner that they are exposed to the surrounding environment.

DETAILED DESCRIPTION OF THE INVENTION

The chemiluminescent system of the invention comprises:
a) an oxalate component comprising an oxalate ester and a solvent;
b) an activator component comprising a peroxide, a catalyst, and water;
c) a surfactant; and
d) a fluorescer.

The oxalate ester employed in the oxalate component may be a straight chain or a branched chain oxalate ester. Suitable straight chain oxalate esters include bis(2,4,5-trichloro-6-carbopentoxy-phenyl)oxalate, bis(2,4,5-trichloro-6-carbobutoxyphenyl)oxalate, bis(2,4,5-trichloro-6-carboisopentyloxyphenyl) oxalate, bis(2,4,5-trichlorophenyl)oxalate, bis(2,4,5-tribromo-6-carbohexoxy-phenyl)oxalate, bis(2-nitrophenyl)oxalate, bis(2,4-dinitrophenyl)oxalate, bis(2,6- dichloro-4-nitrophenyl)oxalate, bis(2,4,6-trichlorophenyl) oxalate, bis(3-trifluoro-methyl-4-nitrophenyl)oxalate, bis(2-methyl-4,6-dinitrophenyl oxalate), bis(1,2-dimethyl-4,6-dinitrophenyl)oxalate, bis(2,4-dichlorophenyl)oxalate, bis(2,4-dinitrophenyl)oxalate, bis(2,5-di-nitrophenyl)oxalate, bis (2-formyl-4-nitrophenyl) oxalate, bis(pentachlorophenyl) oxalate, bis(1,2-dihydro-2-oxo-1-pyridyl)glyoxal, bis(2,4-dinitro-6-methyl-phenyl)oxalate and bis-N-phthalimidyl oxalate.

Suitable branched chain oxalate esters include bis{3,4,6-trichloro-2-[(2-methyl-propoxy)carbonyl]phenyl}oxalate, bis{3,4,6-trichloro-2-[(phenylmethoxy-carbonyl]phenyl}oxalate, bis{3,4,6-trichloro-2-[(2,2-dimethylpropoxy)carbonyl]phenyl}oxalate and bis{3,4,6-trichloro-2-[(cyclohexylmethoxy)carbonyl]phenyl}oxalate.

The preferred oxalate ester for use in the oxalate component comprises bis(2,4,5-trichloro-6-carbopentoxy-phenyl)oxalate, hereinafter referred to as "CPPO". The oxalate ester is present in the oxalate component in an amount of about 3 to about 26 wt. %, based on the weight of the oxalate component.

Suitable solvents for use in the oxalate component include acetyl tributyl citrate, acetyl triethyl citrate, benzyl benzoate, butyl benzoate, ethyl acetate, ethyl benzoate, diethylene glycol benzoate, diethylene glycol dibenzoate, dipropylene glycol benzoate, dipropylene glycol dibenzoate, propylene glycol benzoate, ethylene glycol monobutyl ether acetate, diethylene glycol monobutyl ether acetate, propylene glycol and mixtures of two or more of the foregoing solvents.

The preferred solvent for use in the oxalate component comprises dipropylene glycol dibenzoate. The solvent will be present in the oxalate component in an amount of about 74 to about 97 wt. %, based on the weight of the oxalate component.

In respect to the activator component, the peroxide may be inorganic or organic. Suitable peroxides include hydrogen peroxide, sodium peroxide, sodium perborate, sodium pyrophosphate peroxide, urea peroxide, histidine peroxide, t-butylhydroperoxide and peroxybenzoic acid.

Preferably, the peroxide comprises hydrogen peroxide. The peroxide will be present in an amount of about 0.5 to about 5 wt. %, based on the weight of the activator component.

Suitable examples of the catalyst employed in the activator include sodium salicylate, sodium-5-fluorosalicylate sodium-5-chlorosalicylate, sodium-5-bromo-salicylate, sodium trifluoroacetate, potassium salicylate, potassium pentachloro-phenolate, lithium salicylate, lithium-3-chlorosalicylate, lithium-5-chloro-salicylate, lithium-3,5-dichlorosalicylate, lithium-3,5,6-trichlorosalicylate, lithium-2-chlorobenzoate, lithium-5-t-butylsalicylate, lithium trifluoroacetate, rubidium acetate, tetrabutylammonium salicylate, tetrabutylammonium tetrafluoroborate, tetraethylammonium benzoate, tetrabutylammonium benzoate, tetrabutylammonium hexafluorophosphate, tetraethylammonium perchlorate, tetrabutylammonium perchlorate, tetraoctylammonium perchlorate, tetrabutylammonium-2,3,5-trichlorobenzoate, tetramethylammonium trifluoroacetate, magnesium salicylate, magnesium-5-t-butylsalicylate, mgnesium-3-chlorosalicylate, magnesium-3,5-dichlorosalicylate and magnesium-3,5,6-trichlorosalicylate.

Preferably, the catalyst comprises sodium salicylate. The catalyst is present in the activator component in an amount of about 0.001 to about 0.05 wt. %, based on the weight of the activator component.

Water is present in the activator component in an amount of about 95 to about 99.5 wt. %, based on the weight of the activator component.

The ratio of the oxalate component to the activator component is in the range of about 5:1 to about 1:5, on a weight basis.

The surfactant employed in the activator component may be any one or more of the following classes: anionic, cationic, nonionic or amphoteric. The surfactant may consist of multiple classes of surfactants as well as multiple surfactants within each class.

Suitable anionic surfactants include ammonium laureth sulfate, ammonium lauryl sulfate, ammonium decyl sulfate, ammonium octyl sulfate, dioctyl sodium sulfosuccinate, disodium oleamide sulfosuccinate, disodium laureth sulfosuccinate, disodium dioctyl sulfosuccinate, lauryl sarcosine, cocoyl sarcosine, perfluorobutanesulfonic acid, perfluorononanoic acid, perfluorooctanesulfonic acid, perfluorooctanoic acid, potassium lauryl sulfate, potassium coco hydrolyzed collagen, sodium decyl sulfate, sodium laureth sulfate, sodium lauryl sulfate, sodium methyl cocoyl taurate, sodium lauroyl sarcosinate, sodium octyl sulfate, sodium dodecyl benzenesulfonate, triethanolamine lauryl sulfate, triethanolamine laureth sulfate and mixtures of two or more of the foregoing anionic surfactants.

Suitable cationic surfactants include lauryl dimethyl benzyl ammonium chloride; stearalkonium chloride; benzalkonium chloride; cetrimonium chloride; cetalkonium chloride; behentrimonium chloride; behentrimonium PG-trimonium chloride; dihydroxypropyl PEG-5 linoleammonium chloride; imidazolines, e.g. cocoamphocarboxyglycinate, lauroamphocarboxyglycinate, caproamphoglycinate, caproamphocarboxyglycinate; PEG-15 cocomonium chloride; polymethacrylamidopropyl trimonium chloride and mixtures of two or more of the foregoing cationic surfactants. The preferred cationic surfactant comprises lauryl dimethyl benzyl ammonium chloride.

Suitable nonionic surfactants include phenoxyethanol, alkanolamides, PEG 20 cetostearyl ether, cetostearyl alcohol, cellulose ethers, cetyl alcohol, cocamide diethanolamine, cocamide monoethanolamine, decyl glucoside, glyceryl laurate, PEG ether of isocetyl alcohol, lauryl glucoside, cetylphenoxypolyethoxyethanol, nonylphenoxypolyethoxyethanol, 1-(4-nonylphenyl)-1,4,7,10,13,16,19,22,25-nonaoxa-heptacosan-1-ol, octaethylene glycol monododecyl ether, octyl glucoside, oleyl alcohol, pentaethylene glycol monododecyl ether, triblock copolymers of polypropylene glycol, polyglycerol polyricinoleate, polyoxyethylene sorbitan monooleate, polyalkylene oxide-modified polydimethylpolysiloxanes, sorbitan monostearate, sorbitan tristearate, stearyl alcohol, octyl phenol ethoxylate and mixtures of two or more of the foregoing nonionic surfactants. The preferred nonionic surfactant comprises phenoxyethanol.

Suitable amphoteric surfactants include aminopropionic acids, cocoamidopropyl betaine, lauramidopropyl betaine, cocoalkylamine acetates, cocoamidoalkylamino acetates, cocoalkylamine diacetates, cocoalkylamine propionates, cocoalkylamine dipropionates, cocoalkylamine hydroxypropyl-sulfonates, sodium cocoamidoalkylamino hydroxypropyl sulfonates, imido propionic acids, an alkyl sulfobetaine, amine oxides, N-dodecyl β-alanine, sulfamic acid, dodecylamine, polyacrylamide, lauramidopropylamine oxide and mixtures of two or more of the foregoing amphoteric surfactants. Preferably, the amphoteric surfactant comprises lauramidopropyl betaine.

The surfactant is present in an amount of about 0.1 to about 5 wt. %, based on the weight of the chemiluminescent system.

Preferably, the surfactant will be present in the activator component. The fluorescer comprises a compound having a spectral emission in the range of about 300 to about 1,000 mµ. Suitable fluorescers include rubrene, 9,10-bis(phenylethynyl)anthracene, 9,10-bis(4-methoxyphenyl)-2-chloroanthracene, 1-chloro-9,10-bis(phenylethynyl)anthracene, 1,8-dichloro-9,10-bis(phenylethynyl) anthracene, 1,5-dichloro-9,10-bis(phenylethynyl)anthracene, 2,5-di-chloro-9,10-bis (phenylethynyl)anthracene, 5,12-bis(phenylethynyl) tetracene, 9,10-di-phenylanthracene, perylene, 2-methyl-9,10-bis(phenylethynyl)anthracene, 2-ethyl-9,10-bis (phenylethynyl)anthracene, 1,6,7,12-tetraphenoxy-N,N'-bis (2,6-diisopropylphenyl)-3,4,9,10-perylene dicarboximide, 1,6,7,12-tetraphenoxy-N,N'-bis(2,5-di-t-butylphenyl)-3,4,9, 10-perylene dicarboximide, 1,7-dichloro-6,12-diphenoxy-N, N'-bis(2,6-diisopropyl-phenyl)-3,4,9,10-perylene dicarboximide, 1,6,7,12-tetra(p-bromophenoxy)N,N'-bis(2,6-diisopropylphenyl)-3,4,9,10-perylene dicarboximide, 1,6,7, 12-tetra(p-t-butylphenoxy)-N,N'-dineo-pentyl-3,4,9,10-perylenedicarboximide, 1,6,7,12-tetra(o-chlorophenoxy)-N, N'-bis(2,6-diisopropylphenyl)-3,4,9,10-perylene dicarboximide, 1,6,7,12-tetra(p-chloro-phenoxy)-N,N'-bis (2,6-diisopropyl-phenyl)-3,4,9,10-perylenedicarboximide, 1,6,7,12-tetra(p-fluorophenoxy)-N,N'-bis(2,6-diisopropyl-phenyl)-3,4,9,10-perylenedicarboximide, 1,6,7,12-tetraphenoxy-N,N'-dietrhyl-3,4,9,10-perylene dicarboximide, 1,7-dibromo-6,12-diphenoxy-N,N'-bis(2-iso-propylphenyl)-3,4, 9,10-perylenedicarboximide, 16,17-dihexyloxyviolanthrone, 2-ethyl-9,10-bus(phenylethynyl) anthracene, 1,4-dimethyl-9,10-bis(phenylethynyl) anthracene, bis(phenylethynyl)anthracene, N,N'-didodecyl-1,6,7,12-tetrakis(4-t-butylpenoxy)-3,4,9,10-perylene tetracarboximide, N,N'-dihexa-decyl-1,6,7,12-tetrakis(4-t-butylphenoxy)-3,4,9,10-perylenedicarboximide, N,N'-diocta-decyl-1,6,7,12-tetrakis(4-t-butylphenoxy)-3,4,9,10-perylenetetracarboximide, 9,10-bis(4-methyl-phenyl)-2-chloroanthracene, 9,10-bis(4-ethylphenyl)-2-chloroanthracene, 9,10-bis(4-propylphenyl)-2-chloroanthracene, 9,10-bis(4-t-butyl-phenyl-2-chloro-anthracene and mixtures of two or more of the foregoing fluorescers.

Preferably, the fluorescer comprises 9,10-bis(4-methoxyphenyl)-2-chloro-anthracene, 9,10-diphenylanthracene or rubrene.

The fluorescer may be pre-mixed with the oxalate component, the activator component or both the oxalate component and the activator component. Preferably, the fluorescer is present in the oxalate component.

The fluorescer is present in an amount of about in an amount of about 0.05 to about 0.5 wt. %, based on the weight of the chemiluminescent system.

The components and ingredients comprising the chemiluminescent system may be packaged in two or more separate packages. Of course, the chemiluminescent system is packaged such that the oxalate component is kept separate from the peroxide component until such time that it is desired to produce a chemiluminescent effect.

Typically, the chemiluminescent system as disclosed herein will produce a kick-off glow intensity of 400-500 lux within a few seconds after admixture of the oxalate component containing a fluorescer and the activator component containing the surfactant. The intensity of the glow will be about 25 lux after 5 minutes and gradually decrease to the point of about 1 lux after six hours. The color of the glow produced by the chemiluminescent system of the invention will be dependent upon the choice of fluorescer. For example, an orange color is produced using rubrene as the fluorescer, a green color is produced using 9,10-bis(4-methoxyphenyl)-2-chloroanthracene and a red color is produced using 9,10-diphenyl anthracene.

The present invention also pertains to a self-illuminating bubble-forming composition comprising the ingredients:
a) an oxalate component comprising an oxalate ester and a solvent;
b) an activator component comprising a peroxide, a catalyst and water;
c) a fluorescer;
d) an aqueous bubble-forming solution; and
e) a surfactant which may be present in the activator component, the aqueous bubble-forming solution or in both the activator component and the aqueous bubble-forming solution Ingredients a), b), c), and e) have been described above in respect to the chemiluminescent system of the invention. Ingredient d) is a typical aqueous bubble-forming solution.

Typically, the aqueous bubble-forming solution will contain compounds such as a quaternary ammonium salt; a betaine; a hydroxyalkyl cellulose, e.g. hydroxyethyl cellulose, hydroxypropyl methyl cellulose, hydroxybutyl methyl cellulose; phenoxyethanol; hydantoin; glycerin, triethanolamine; a $C_1$-$C_4$ alkyl paraben, a phenyl ester; and mixtures of two or more of the foregoing compounds. The preferred quaternary ammonium salt comprises lauryl dimethyl benzyl ammonium chloride. The preferred betaine comprises lauramidopropyl betaine. The preferred hydroxyalkyl cellulose comprises hydroxyethylcellulose.

The bubble-forming solution is present in an amount of about 70 to about 95 wt. %, based on the weight of the composition.

One or more water-soluble polymers may also be incorporated in the bubble-forming solution in order to strengthen the wall of the self-illuminated bubble produced from the solution. Suitable water-soluble polymers include acrylic homo- and co-polymers, e.g. poly(2-hydroxyethylmethacrylate, poly(acrylic acid), poly(methacrylic acid); homo- and co-polymers of acrylamide, e.g. poly(N,N-dimethylacrylamide) and poly(2-hydroxyethylmethacrylamide); polyethylene glycol; poly(N-vinylpyrrolidone); poly(N-vinyl-ethyl acetamide); poly(N-vinyl-N-ethyl formamide; poly(N-vinyl-methyl acetamide); block copolymers of ethylene oxide; block copolymers of propylene oxide; polyvinyl acetate; polyvinyl alcohol; and mixtures of two or more of the foregoing water soluble polymers.

The self-illuminating bubble-forming composition disclosed herein will be packaged in at least two separate packages. When self-illuminating bubbles are desired, the oxalate component containing a fluorescer and the activator component containing a surfactant are mixed with the bubble-forming solution. The resultant mixture is then capable of forming self-illuminating bubbles by conventional means, e.g. by dipping a ring-shaped article into the mixture followed by blowing into the ring to form one or more bubbles. Alternatively, the ring may be moved in order to force air through the ring and form the bubbles. It is also possible to dispense glowing bubbles from the self-illuminating bubble-forming solution by battery and/or hand-powered and/or mechanically powered means.

It is also within the ambit of this invention to provide a self-illuminated glowing solution or fluid that does not necessarily produce bubbles. Such solution or fluid may be employed to provide glowing coloration devices such as to toys or the like that may contain the self-illuminated solution or fluid or that may dispense the self-illuminated glowing solution or fluid into an open environment. For example, the self-illuminated solution or fluid may be used in non-bubble toy applications such as toy squirt guns or the like where the self-illuminated glowing solution or fluid is dispensed therefrom.

The following nonlimiting examples shall serve to illustrate the several embodiments of the invention. Unless otherwise indicated, all parts and percentages are on a weight basis.

EXAMPLE 1

The oxalate component was prepared by mixing the following ingredients:
Oxalate ester: "CPPO", 50 g
Fluorescer: 2-methyl-9,10-bis(phenylethynyl)anthracene, 1 g
Solvent: acetyl tributyl citrate, 449 g
TOTAL: 500 g The activator component was prepared by mixing the following ingredients:
Peroxide: hydrogen peroxide (70%), 17.5 g
Catalyst: sodium salicylate, 0.15 g
Cationic surfactant: lauryl dimethyl benzyl ammonium chloride, 0.5 g
Amphoteric surfactant: lauramidopropyl betaine, 2.5 g
Nonionic surfactant: phenoxyethanol, 0.3 g
Antimicrobial preservative: DMDM hydantoin, 0.3 g
Thickening agent: hydroxyethylcellulose, 0.5 g
Water: 478.25 g
TOTAL: 500 g After the oxalate and activator components were prepared as recited above, 7 g of the oxalate component were mixed with 3 g of the activator component. The mixture was shaken for 2-3 seconds. The green glow measurements, in lux, of the resultant chemiluminescent system were as follows ("KO" indicates "kick-off", the initial glow reading taken within 5 seconds).

| KO | 15 min | 1 h | 2 h | 3 h | 4 h | 5 h |
| --- | --- | --- | --- | --- | --- | --- |
| 409 | 20 | 15 | 11 | 8 | 6 | 4 |

EXAMPLE 2

The oxalate component was prepared by mixing the following ingredients:
Oxalate ester: "CPPO", 25 g
Fluorescer: 9,10-bis(4-methoxyphenyl)-2-chloroanthracene, 1 g
Solvent: dipropylene glycol dibenzoate, 474 g
TOTAL 500 G The activator component was prepared by mixing the following ingredients:
Peroxide: hydrogen peroxide (70%), 17.5 g
Catalyst: sodium salicylate, 0.15 g
Cationic surfactant: lauryl dimethyl benzyl ammonium chloride, 0.5 g
Amphoteric surfactant: lauramidopropyl betaine, 2.5 g
Nonionic surfactant: phenoxyethanol, 0.3 g
Antimicrobial preservative: DMDM hydantoin, 0.3 g
Thickening agent: hydroxyethylcellulose, 0.5 g
Water: 478.25 g
TOTAL: 500 g After the oxalate and activator components were prepared as recited above, 7 g of the oxalate component were mixed with 3 g of the activator component. The mixture was shaken for 2-3 seconds. The blue glow measurements, in lux, of the resultant chemiluminescent system were as follows ("KO" indicates "kick-off", the initial glow reading taken within 5 seconds).

| KO | 15 min | 1 h | 2 h | 3 h | 4 h | 5 h |
| --- | --- | --- | --- | --- | --- | --- |
| 20 | 2 | 1.2 | 0.8 | 0.7 | 0.6 | 0.4 |

EXAMPLE 3

The oxalate component was prepared by mixing the following ingredients:
Oxalate ester: "CPPO", 50 g
Fluorescer: rubrene, 1 g
Solvent: dipropylene glycol dibenzoate, 474 g
TOTAL: 500 g The activator component was prepared by mixing the following ingredients:
Peroxide: hydrogen peroxide (70%), 17.5 g
Catalyst: sodium salicylate, 0.1 g
Cationic surfactant: lauryl dimethyl benzyl ammonium chloride, 2.5 g
Water: 479.9 g
TOTAL 500 g The bubble-forming solution was prepared by mixing the following ingredients:
Amphoteric surfactant: lauramidopropyl betaine, 12.5 g
Thickening agent: hydroxyethylcellulose, 3 g
Nonionic surfactant: phenoxyethanol, 1.5 g
Antimicrobial preservative: DMDM hydantoin, 0.5 g
Antimicrobial preservative: methyl paraben 0.5 g
Water: 482 g
TOTAL: 500 g After the oxalate, activator and bubble-forming solution were prepared as recited above, 100 g of the bubble-forming solution, 10 g of the oxalate component and 5 g of the activator component were mixed together and the mixture was shaken for 2-3 seconds. The orange glow measurements, in lux, of the resultant chemiluminescent system were as follows ("KO" indicates "kick-off", the initial glow reading taken within 5 seconds).

| KO | 5 min | 10 min | 15 min | 30 min | 1 h | 1.5 h | 2 h |
| --- | --- | --- | --- | --- | --- | --- | --- |
| 67 | 25 | 16 | 12 | 8 | 6 | 4 | 2.5 |

Although the invention has been described in connection with specific preferred embodiments, it should be understood that the invention as claimed is not limited to such specific embodiments. It will be apparent to those skilled in the art that various changes may be made without departing from the scope of the invention which is limited only by the claims which follow.

What is claimed is:
1. A self-illuminating bubble-forming composition comprising the ingredients:
   a) an oxalate component comprising an oxalate ester and a solvent;
   b) an activator component comprising a peroxide, a catalyst and water;
   c) a surfactant;
   d) a fluorescer;
   e) an aqueous bubble-forming solution; and
   f) a water-soluble polymer.

2. The composition of claim 1 wherein the oxalate ester comprises a straight chain oxalate ester selected from the group consisting of bis(2,4,5-trichloro-6-carbopentoxyphenyl)oxalate, bis(2,4,5-trichloro-6-carbobutoxy-phenyl)oxalate, bis(2,4,5-trichloro -6-carboisopentyloxyphenyl)oxalate, bis(2,4,5-trichlorophenyl)oxalate, bis(2,4,5-tribromo-6-carbohexoxyphenyl)oxalate, bis(2-nitrophenyl)oxalate, bis(2,4-dinitrophenyl)oxalate, bis(2,6-dichloro-4-nitro-phenyl)oxalate, bis(2,4,6-trichlorophenyl) oxalate, bis(3-trifluoro-methyl-4-nitrophenyl)oxalate, bis(2-methyl-4,6-dinitrophenyl) oxalate, bis(1,2-dimethyl-4,6-dinitrophenyl) oxalate, bis(2,4-dichlorophenyl)oxalate, bis(2,4-dinitrophenyl)oxalate, bis(2,5-dinitrophenyl)oxalate, bis(2-formyl-4-nitrophenyl)oxalate, bis(pentachlorophenyl)oxalate, bis(1,2-dihydro-2-oxo-1-pyridyl)glyoxal, bis(2,4-dinitro-6-methylphenyl)oxalate and bis-N-phthalimidyl oxalate.

3. The composition of claim 2 wherein the oxalate ester comprises bis (2,4,5-trichloro-6-carbopentoxyphenyl) oxalate.

4. The composition of claim 1 wherein the oxalate ester comprises a branched chain oxalate ester selected from the group consisting of bis{3,4,6-trichloro-2-[(2-methyl-propoxy)carbonyl]phenyl}oxalate, bis {3,4,6-trichloro-2-[(phenylmethoxycarbonyl]phenyl}oxalate, bis {3,4,6-trichloro-2-[(2,2-dimethylpropoxy)carbonyl]phenyl}oxalate and bis {3,4,6-trichloro-2-[(cyclohexylmethoxy)carbonyl]phenyl}oxalate.

5. The composition of claim 1 wherein the oxalate ester is present in an amount of about 3 to about 26 wt. %, based on the weight of the oxalate component.

6. The composition of claim 1 wherein the solvent is selected from the group consisting of acetyl tributyl citrate, acetyl triethyl citrate, benzyl benzoate, butyl benzoate, ethyl acetate, ethyl benzoate, diethylene glycol benzoate, diethylene glycol dibenzoate, dipropylene glycol benzoate, dipropylene glycol dibenzoate, propylene glycol benzoate, ethylene glycol monobutyl ether acetate, diethylene glycol monobutyl ether acetate, propylene glycol and mixtures of two or more of the foregoing solvents.

7. The composition of claim 6 wherein the solvent comprises dipropylene glycol dibenzoate.

8. The composition of claim 1 wherein the solvent is present in an amount of about 74 to about 97 wt. %, based on the weight of the oxalate component.

9. The composition of claim 1 wherein the peroxide is selected from the group consisting of hydrogen peroxide, sodium peroxide, sodium perborate, sodium pyrophosphate peroxide, urea peroxide, histidine peroxide, t-butylhydroperoxide and peroxybenzoic acid.

10. The composition of claim 9 wherein the peroxide comprises hydrogen peroxide.

11. The composition of claim 1 wherein the peroxide is present in an amount of about 0.5 to about 5 wt. %, based on the weight of the activator component.

12. The composition of claim 1 wherein the catalyst is selected from the group consisting of sodium salicylate, sodium-5-fluorosalicylate, sodium-5-chlorosalicylate, sodium-5-bromosalicylate, sodium trifluoroacetate, potassium salicylate, potassium pentachlorophenolate, lithium salicylate, lithium-3-chlorosalicylate, lithium-5-chloro-salicylate, lithium-3,5-dichlorosalicylate, lithium-3,5,6-trichlorosalicylate, lithium-2-chlorobenzoate, lithium-5-t-butylsalicylate, lithium trifluoroacetate, rubidium acetate, tetrabutylammoniumsalicylate, tetrabutylammoniumtetrafluoroborate, tetraethylammonium benzoate, tetrabutylammonium benzoate, tetrabutylammonium hexafluorophosphate, tetraethylammonium perchlorate, tetrabutylammonium perchlorate, tetraoctylammonium perchlorate, tetrabutylammonium-2,3,5-trichloro-benzoate, tetramethylammonium trifluoroacetate, magnesium salicylate, magnesium-5-t-butylsalicylate, magnesium-3-chlorosalicylate, magnesium-3,5-dichlorosalicylate and magnesium-3,5,6-trichlorosalicylate.

13. The composition of claim 12 wherein the catalyst comprises sodium salicylate.

14. The composition of claim 1 wherein the catalyst is present in an amount of about 0.001 to about 0.05 wt. %, based on the weight of the activator component.

15. The composition of claim 1 wherein the water in the activator component is present in an amount of about 95 to about 99.5 wt. %, based on the total weight of the activator component.

16. The composition of claim 1 wherein the ratio of the oxalate component to the activator component is in the range of about 5:1 to about 1:5, on a weight basis.

17. The composition of claim 1 wherein the surfactant comprises an anionic surfactant, a cationic surfactant, a nonionic surfactant, an amphoteric surfactant or a mixture of two or more of the foregoing classes of surfactants.

18. The composition of claim 17 wherein the anionic surfactant is selected from the group consisting of ammonium laureth sulfate, ammonium lauryl sulfate, ammonium decyl sulfate, ammonium octyl sulfate, dioctyl sodium sulfosuccinate, disodium oleamide sulfosuccinate, disodium laureth sulfosuccinate, disodium dioctyl sulfosuccinate, lauryl sarcosine, cocoyl sarcosine, perfluorobutanesulfonic acid, perfluorononanoic acid, perfluorooctanesulfonic acid, perfluorooctanoic acid, potassium lauryl sulfate, potassium coco hydrolyzed collagen, sodium decyl sulfate, sodium laureth sulfate, sodium lauryl sulfate, sodium methyl cocoyl taurate, sodium lauroyl sarcosinate, sodium octyl sulfate, sodium dodecyl benzenesulfonate, triethanolamine lauryl sulfate, triethanolamine laureth sulfate and mixtures of two or more of the foregoing anionic surfactants.

19. The composition of claim 17 wherein the cationic surfactant is selected from the group consisting of lauryl dimethyl benzyl ammonium chloride, stearalkonium chloride, benzalkonium chloride, cetrimonium chloride, cetalkonium chloride, behentrimonium chloride, behentrimonium PG-trimonium chloride, dihydroxypropyl PEG-5 linoleammonium chloride, imidazolines, PEG-15 cocomonium chloride, polymethacrylamidopropyl trimonium chloride and mixtures of two or more of the foregoing cationic surfactants.

20. The composition of claim 19 wherein the cationic surfactant comprises lauryl dimethyl benzyl ammonium chloride.

21. The composition of claim 17 wherein the nonionic surfactant is selected from the group consisting of phenoxyethanol, alkanolamides, PEG 20 cetostearyl ether, cetostearyl alcohol, cellulose ethers, cetyl alcohol, cocamide diethanolamine, cocamide monoethanolamine, decyl glucoside, glyceryl laurate, PEG ether of isocetyl alcohol, lauryl glucoside, cetylphenoxypolyethoxyethanol, nonylphenoxypolyethoxyethanol, 1-(4-nonylphenyl)-1,4,7,10,13,16,19,22,25-nonaoxa-heptacosan-1-ol, octaethylene glycol monododecyl ether, octyl glucoside, oleyl alcohol, pentaethylene glycol monododecyl ether, triblock copolymers of polypropylene glycol, polyglycerol polyricinoleate, polyoxyethylene sorbitan monooleate, polyalkylene oxide-modified polydimethylpolysiloxanes, sorbitan monostearate, sorbitan tristearate, stearyl alcohol, octyl phenol ethoxylate and mixtures of two or more of the foregoing nonionic surfactants.

22. The composition of claim 21 wherein the nonionic surfactant comprises phenoxyethanol.

23. The composition of claim 17 wherein the amphoteric surfactant is selected from the group consisting of aminopropionic acids, cocoamidopropyl betaine, lauramidopropyl betaine, cocoalkylamine acetates, cocoamidoalkylamino acetates, cocoalkylamine diacetates, cocoalkylamine propionates, cocoalkylamine dipropionates, cocoalkylamine hydroxylpropylsulfonates, sodium cocoamidoalkylamino hydroxypropyl sulfonates, imidopropionic acids, an alkyl sulfobetaine, amine oxides, N-dodecyl .beta.-alanine, sulfamic acid, dodecylamine, polyacrylamide, lauramidopropylamine oxide and mixtures of two or more of the foregoing amphoteric surfactants.

24. The composition of claim 23 wherein the amphoteric surfactant comprises lauramidopropyl betaine.

25. The composition of claim 1 wherein the surfactant is present in an amount of about 0.1 to about 5 wt. %, based on the total weight of the composition.

26. The composition of claim 1 wherein one or more of the same or different surfactants are present in the activator component; the oxalate component; the activator component and the oxalate component; the aqueous bubble-forming solution; the activator component and the aqueous bubble-forming solution; the oxalate component and the aqueous bubble-forming solution; or in the oxalate component, the activator component and the aqueous bubble-forming solution.

27. The composition of claim 1 wherein the fluorescer is selected from the group consisting of rubrene, 9,10-bis(phenylethynyl)anthracene, 9,10-bis(4-methoxyphenyl)-2-chloroanthracene, 1-chloro-9,10-bis(phenylethynyl)anthracene, 1,8-dichloro-9,10-bis(phenylethynyl)anthracene, 1,5-dichloro-9,10-bis(phenylethynyl)anthracene, 2,5-di-chloro-9,10-bis(phenylethynyl)anthracene, 5,12-bis(phenylethynyl)tetracene, 9,10-diphenylanthracene, perylene, 2-methyl-9,10-bis(phenylethynyl)anthracene, 2-ethyl-9,10-bis(phenylethynyl)anthracene, 1,6,7,12-tetraphenoxy-N,N'-bis(2,6-diisopropylphenyl)-3,4,9,10-perylenedi- carboximide, 1,6,7,12-tetraphenoxy-N,N'-bis(2,5-di-t-butyl-phenyl)-3,4,9,10-peryleneox- imide, 1,7-di-chloro-6,12-diphenoxy-N,N'-bis(2,6-diisopropyl-phenyl)-3,4,9-,10-perylenedicarboximide, 1,6,7,12-tetra(p-bromophenoxy) N,N'-bis(2,6-diisopropylphenyl)-3,4,9,10-perylenedicarboximide, 1,6,7,12-tetra(p-t-butylphenoxy)-N,N'-dineopentyl-3,4,9,10-perylenedicarb- oximide, 1,6,7,12-tetra(o-chlorophenoxy)-N,N'-bis(2,6-diisopropylphenyl)-3-,4,9,10-perylene-dicarboximide, 1,6,7,12-tetra(p-chloro-phenoxy)-N,N'-bis(2,6-diisopropylphenyl)-3,4,9,10-perylenedicarboximide, 1,6,7,12-tetra(p-fluorophenoxy)-N,N'-bis(2,6-diisopropylphenyl)-3,4,9,10-perylenedicarboximide, 1,6,7,12-tetraphenoxy-N,N'-dietrhyl-3,4,9,10-perylene dicarboximide, 1,7-dibromo-6,12-diphenoxy-N,N'-bis(2-iso-propylphenyl)-3,4,9,10-perylene- dicarboximide, 16,17-dihexyloxyviolanthrone, 2-ethyl-9,10-bis(phenylethynyl)anthracene, 1,4-dimethyl-9,10-bis(phenyl-ethynyl)anthracene, bis(phenylethynyl)anthracene, N,N'-didodecyl-1,6,7,12-tetrakis(4-t-butylpenoxy)-3,4,9,10-perylenetetrac-arboximide, N,N'-dihexadecyl-1,6,7,12-tetrakis(4-t-butyl-phenoxy)-3,4,9,10-perylenedi- carboximide, N,N'-dioctadecyl-1,6,7,12-tetrakis(4-t-butyl-phenoxy)-3,4,9,10-perylenete- tracarboximide, 9,10-bis(4-methylphenyl)-2-chloroanthracene, 9,10-bis(4-ethylphenyl)-2-chloroanthracene, 9,10-bis(4-propylphenyl)-2-chloroanthracene, 9,10-bis(4-t-butylphenyl-2-chloroanthracene and mixtures of two or more of the foregoing fluorescers.

28. The composition of claim 27 wherein the fluorescer is selected from the group consisting of 9, 10-bis (4-methoxyphenyl)-2-chloroanthracene, 9, 10-diphenyl-anthracene, rubrene and mixtures thereof.

29. The composition of claim 1 wherein the fluorescer is present in the oxalate component.

30. The composition of claim 1 wherein the fluorescer is present in an amount of about 0.05 to about 0.5 wt. %, based on the total weight of the composition.

31. The composition of claim 1 wherein the composition is packaged such that the oxalate component is kept separate from the peroxide component until such time that it is desired to produce a self-illuminating bubble.

32. The composition of claim 1 wherein the bubble-forming solution is present in an amount of about 70 to about 95 wt. %, based on the weight of the composition.

33. The composition of claim 1 wherein the water-soluble polymer is present in the aqueous bubble-forming solution.

34. A packaged self-illuminated bubble-forming system comprising:
  (I) a composition comprising the ingredients:
    a) an oxalate component comprising an oxalate ester and a solvent;
    b) an activator component comprising a peroxide, a catalyst and water;
    c) a surfactant;
    d) a fluorescer;
    e) an aqueous bubble-forming solution; and
    f) a water-soluble polymer, wherein one or more of the same or different surfactants are present in the activator component; the oxalate component; the activator component and the oxalate component; the aqueous bubble-forming solution; the activator component and the aqueous bubble-forming solution; the oxalate component and the aqueous bubble-forming solution; or in the oxalate component, the activator component and the aqueous bubble-forming solution, and
  (II) means for making a self-illuminating bubble by combining ingredients a)-f).

* * * * *